US006556984B1

(12) United States Patent
Zien

(10) Patent No.: US 6,556,984 B1
(45) Date of Patent: Apr. 29, 2003

(54) HIERARCHICAL STRING MATCHING USING MULTI-PATH DYNAMIC PROGRAMMING

(75) Inventor: Jason Yeong Zien, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/233,995

(22) Filed: Jan. 19, 1999

(51) Int. Cl.$^7$ .......................... G06F 17/30; G06F 7/00; G06F 15/00
(52) U.S. Cl. .................... 707/2; 707/3; 707/6; 707/10; 715/501.1
(58) Field of Search ........................... 707/501.1, 3, 6, 707/10, 2

(56) References Cited

U.S. PATENT DOCUMENTS

| | | | | |
|---|---|---|---|---|
| 3,568,156 A | * | 3/1971 | Thompson | 340/172.5 |
| 4,319,357 A | | 3/1982 | Bossen | 714/753 |
| 5,168,533 A | * | 12/1992 | Kato et al. | 382/54 |
| 5,220,567 A | | 6/1993 | Dooley et al. | 714/704 |
| 5,576,955 A | | 11/1996 | Newbold et al. | 707/533 |
| 5,608,874 A | | 3/1997 | Ogawa et al. | 709/246 |
| 5,689,626 A | | 11/1997 | Conley | 358/1.18 |
| 5,706,498 A | | 1/1998 | Fujimiya et al. | 707/6 |
| 5,710,916 A | * | 1/1998 | Barbara et al. | 707/3 |
| 5,751,898 A | | 5/1998 | Kosaka et al. | 704/241 |
| 5,761,538 A | * | 6/1998 | Hull | 382/186 |
| 5,978,797 A | * | 11/1999 | Yianilos | 707/3 |
| 6,144,962 A | * | 11/2000 | Weinberg et al. | 707/10 |
| 6,178,461 B1 | * | 1/2001 | Chan et al. | 709/219 |
| 6,311,179 B1 | * | 10/2001 | Agarwal et al. | 707/3 |
| 6,321,224 B1 | * | 11/2001 | Beall et al. | 707/5 |

FOREIGN PATENT DOCUMENTS

| | | |
|---|---|---|
| EP | 0 814 582 A2 | 12/1997 |
| WO | WO 97/18519 | 5/1997 |
| WO | WO 97/22947 | 6/1997 |
| WO | WO 98/18070 | 4/1998 |

OTHER PUBLICATIONS

Levenshtein, V.I., "Binary Codes Capable of Correcting Deletions, Insertions, and Reversals", Soviet Physics –Doklady, vol. 10, No. 8, Feb. 1966, pp. 707–710.

Sellers, Peter H., "On the Theory and Computation of Evolutionary Distances", SIAM Journal o f Applied Mathematics, vol. 26, No. 4, Jun. 1974, pp. 787–793.

(Abstract) Garrow, GSD, Xydeas, CS, Oakley JP, Divisional of Electrical Engineering, Manchester University , UK, "Model Matching in Intelligent Document Understanding", Proceedings of the Third International Conference on Document Analysis and Recognition, Pt. vol. 1, pp. 293–296 vol. 1, IEEE Computer Soc. Press.

(Abstract) Szanser, AJ, "Bracketing Technique in Elastic Matching", Nat. Phys. Lab., Teddington, U.K., Computer Journal, vol. 16, No. 2, pp. 132–134, May 1973.

(Abstract in English) Corresponding to German Patent Reference DE 19622478 above.

\* cited by examiner

*Primary Examiner*—Joseph H. Feild
*Assistant Examiner*—Rachna Singh
(74) *Attorney, Agent, or Firm*—Gates & Cooper LLP

(57) ABSTRACT

A method, system, and article of manufacture for generating a list of candidate objects for a requested object. An identifier for the requested object is accepted, wherein the identifier comprises a target string. A list of candidate objects is generated when the requested object cannot be found by performing a hierarchical string match for the target string against a set of source strings using multi-path dynamic programming, wherein the set of source strings represent a set of objects from which the list of candidate objects is generated.

54 Claims, 9 Drawing Sheets

HIERARCHICAL STRING MATCHING USING MULTI-PATH DYNAMIC PROGRAMMING

BACKGROUND OF THE INVENTION

1. Field of the Invention

The present invention relates to a system and method for hierarchical string matching using multi-path dynamic programming.

2. Description of Related Art

Modern human-computer interfaces provide many mechanisms that attempt to help in navigating paths through the World Wide Web. Bookmarks can be used to identify frequently visited Web sites, while portals or search engines can be used to identify new Web sites. Nevertheless, the sheer volume of information available today on the Internet inevitably leads to problems in such navigation.

One place where navigation problems arise is in missing URLs (Uniform Resource Locators). For example, one of the most common errors seen when accessing Web servers is the "404 Error", which occurs when a URL cannot be found because the associated page or document has been renamed, removed, moved or deleted from the Web server, causing the link to become broken. This error arises quite often due to the dynamic and changing nature of the Internet, and the fact that bookmarks and search engines often have outdated links to URLs. The error also occurs when a user mistypes the URL.

Thus, there is a need in the art for new approaches to the management of links and pages, especially mechanisms that can apply increased intelligence to the problem of unknown, missing, or mistyped URLs on the Internet. More specifically, there is a need in the art for approaches that simplify the steps a user must go through to obtain access to a URL on the Internet.

By increasing the intelligence of the Web server, a better, user-friendlier way of dealing with these errors is provided by presenting a list of matches similar to the URL that was desired. Since errors (should) occur relatively infrequently, the increased computational needs for handling these error cases should not significantly affect the overall server performance for all but the largest Web sites.

Hierarchical string-matching is useful here, because when an unknown URL is requested, the Web server can then select from a list of similar candidate URLs based on the new method. Moreover, the method of the present invention is very general, and can be additionally applied to a wide range of applications, such as Web servers, proxy servers, email addresses, spelling checkers, file systems and operating systems, and file browsers (command-line or graphical).

SUMMARY OF THE INVENTION

To overcome the limitations in the prior art described above, and to overcome other limitations that will become apparent upon reading and understanding the present specification, the present invention discloses a method, system, and article of manufacture for generating a list of candidate objects for a requested object. An identifier for the requested object is accepted, wherein the identifier comprises a target string. A list of candidate objects is generated when the requested object cannot be found by performing a hierarchical string match for the target string against a set of source strings using multi-path dynamic programming, wherein the set of source strings represent a set of objects from which the list of candidate objects is generated.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The present invention accepts a request for an object, wherein the request comprises a target string. A list of candidate objects is generated when the requested object cannot be found by performing a hierarchical string match for the target string against a set of source strings using multi-path dynamic programming, wherein the set of source strings represent a set of objects from which the list of candidate objects is generated. In one embodiment, the objects comprise URLs (Uniform Resource Locators), although the objects could represent any entity.

The hierarchical string match uses a minimum-cost string edit-distance to generate the list of candidate objects for the target string from the set of source strings. The minimum-cost string edit-distance finds one or more strings from the set of strings that are closest matches to the target string.

The source strings are represented in a hierarchical tree structure, and the minimum-cost string edit-distance is solved by taking advantage of the hierarchical tree structure to minimize computations by re-using previous partially-computed solutions. These previous partially-computed solutions can be reused due to an overlap among source strings in the set of source strings represented in the hierarchical tree structure.

Each of the source strings comprise a path, i.e., a concatenated sequence of nodes that are visited in a traversal from a top-level node to a target node in the hierarchical tree structure. The multi-path dynamic programming comprises a depth first search traversal of the hierarchical tree structure using pre-order node visitation, which is performed to generate an iteration and ordering of all the source strings. This depth first search traversal reuses partial computations of the edit-distance cost for a shared portion of the path traversed in the hierarchical tree structure to generate the ordering of the source strings.

Hardware Environment

Figure 1:
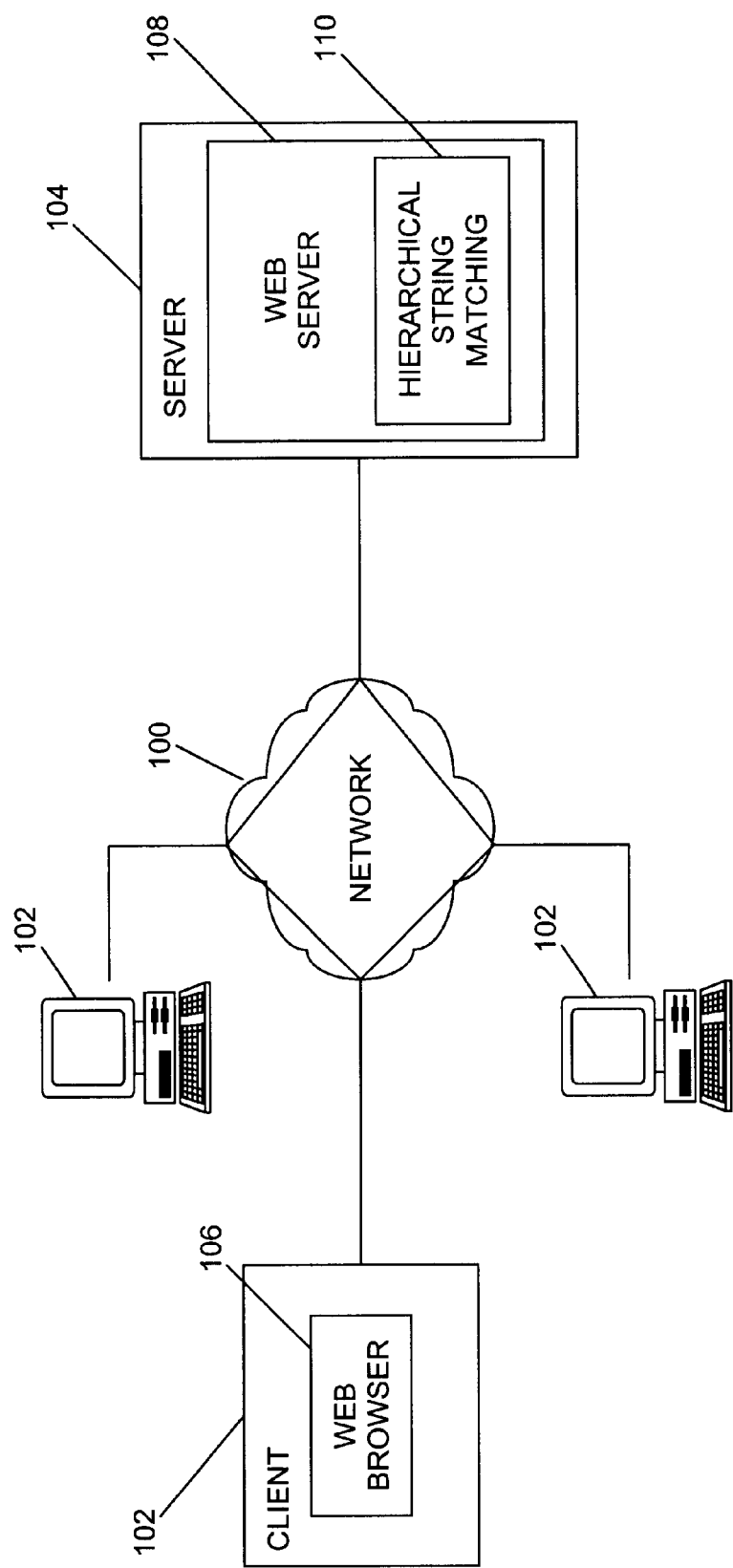
FIG. 1 is a block diagram of an exemplary hardware environment of the preferred embodiment of the present invention.

FIG. 1 is a block diagram of an exemplary hardware environment of the preferred embodiment of the present invention, and more particularly, illustrates a typical distributed computer system, wherein a network 100 connects client computers 102 to server computers 104. The network 100 preferably comprises the Internet, although it could also comprise intranets, extranets, local area networks, wide area networks, etc. A typical combination of resources may include client computers 102 that are personal computers or workstations, and server computers 104 that are personal computers, workstations, minicomputers, and/or mainframes.

Each of the computers generally includes, inter alia, a processor, random access memory (RAM), data storage devices, data communications devices, monitors, input devices, etc. Of course, those skilled in the art will recognize that any combination of the above components, or any number of different components, peripherals, and other devices, may be used in the present invention.

In the preferred embodiment, the client computer 102 executes a Web browser 106, and the server computer 104 executes a Web server 108 and a Hierarchical String Matching process 110. The Web browser 106 is typically a computer program such as IBM's Web Explorer™, Netscape's Navigator™, Microsoft's Internet Explorer™, etc; the Web server 108 is typically a computer program such as IBM's HTTP daemon or other World Wide Web (WWW) daemon; and the Hierarchical String Matching process 110 is a custom computer program implemented according to the present invention.

In the present invention, the Hierarchical String Matching process 110 works with the Web server 108 when a URL requested by the user cannot be located. In response to such situations, the Hierarchical String Matching process 110 generates a list of similar candidate URLs that are presented to the user via the Web server 108 and Web browser 106. In alternative embodiments, the Hierarchical String Matching process 110 could be executed by the client computer 102 rather than the server computer 104 to accomplish these functions. Further, the Hierarchical String Matching process 110 could be used with other applications, such as spell checkers or any application where it is desirable to provide a list of strings that closely match a target input string.

Generally, the Web browser 106, Web server 108, and Hierarchical String Matching process 110 comprise logic and/or data which, when read, executed, and/or interpreted by the client computer 102 and/or server computer 104, causes the client computer 102 and/or server computer 104 to perform the steps necessary to implement and/or use the present invention. Generally, the Web browser 106, Web server 108, and Hierarchical String Matching process 110 are embodied in and/or readable from a device, carrier, or media, such as a memory, data storage device, and/or a remote device coupled to the computer via a data communications device.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Operation of the Hierarchical String Matching Process

The Hierarchical String Matching process 110 uses minimum-cost string edit-distance to find the best (possibly inexact) matches of a target string to a known set of source strings. The goal is to produce a list of the most likely matches using a cost function based on the differences between the target and source strings, where there is some user-defined limit on the number of desired matches or the distance from the target string. An enhanced dynamic programming method is used to solve the minimum-cost string edit-distance problem by taking advantage of a hierarchical tree structure that represents the set of source strings to minimize computations by re-using previous partially-computed solutions.

The following example describes the minimum-cost string edit-distance problem and the dynamic programming method that solves the problem. Let U be a string of characters (e.g., a URL) with mn characters $u_1, u_2, \ldots u_m$. One goal of the Hierarchical String Matching process 110 is to find the top T strings, $V_1, V_2, \ldots V_t$, from a set of strings S (e.g., a set of URLs) that are the closest matches to U. Another alternative goal of the Hierarchical String Matching process 110 is to find the set of T strings within some maximum cost.

A closeness cost function uses the edit-distance cost, which is the cost of transforming U into a string in S. The edit-distance cost is defined as follows:

1. The cost of deleting a character in U is $c_d$.
2. The cost of inserting a character in U is $c_i$.
3. The cost of changing a character in U is $c_c$.

See Levenshtein, V. I., in "Binary Codes Capable of Correcting Deletions, Insertions, and Reversals", Soviet Physics-Doklady, Vol. 10, No. 8., February, 1966, pp. 707–710.

This is a classic dynamic programming problem. See Sellers, Peter H. "On the Theory and Computation of Evolutionary Distances", SIAM Journal of Applied Mathematics, Vol. 26, No. 4., June 1974, pp. 787–793. There is an optimal solution, which is defined recursively using optimal solutions to sub-problems.

Let $U_i$ be the sequence of the first i characters of U, and $V_j$ be the sequence of the first j characters of V, which is a string in the set S of strings that are being compared to U. The optimal cost solution of transforming $U_i$ into $V_j$ can be defined recursively as the minimum of:

1. the cost of transforming $U_{i-1}$ into $V_j + c_i$,
2. the cost of transforming $U_i$ into $V_{j-1} + c_d$, or
3. the cost of transforming $U_{i-1}$ into $V_{j-1} + c_c$ if $u_i = = v_j$, or zero if $u_i != v_j$.

The boundary conditions that need to be set are:

1. the cost of transforming $U_0$ into $V_0$=0,
2. the cost of transforming $U_i$ into $V_0$=the cost of transforming $U_{i-1}$ into $V_0$+$c_d$, and
3. the cost of transforming $U_0$ into $V_i$=the cost of transforming $U_0$ into $V_{i-1}$+$c_i$.

The solution to this problem is to build a table (tableau) of values with partial solutions, until the full problem is finally solved. Each entry of the tableau T is called $T_{x,y}$, where $T_{x,y}$ is the minimum cost of transforming $U_x$ into $V_y$. If U has m characters and V has n characters, then the optimal solution takes $O(m*n)$ time to compute.

First the tableau is filled in with the boundary conditions, and then the tableau is filled in starting from the $T_{1,1}$ coordinate and increasing gradually to get to the final solution at the $T_{m,n}$ coordinate. Recall that S is the set of potential string matches. Since there are $\|\|S\|\|$ comparisons to perform, the above dynamic programming problem could be solved for every string V in S. However, that does not take into account the fact that many strings in S have common partial subsequences.

For example, consider the following hypothetical set of URLs in S:

/products/index.html
/products/desktop/Aptiva.html
/products/desktop/features.html
/products/desktop/Aptiva.jpg
/products/portable/ThinkPad600/features.html
/products/portable/ThinkPad600/specs.html
/products/portable/ThinkPad600/ordering.html
/products/portable/ThinkPad600/tpad600.jpg Speed improvements are obtainable by reusing solution computations. Note that there is a significant amount of overlap in the set of source strings. For example, if the target string:

/products/portable/ThinkPad600/Specs.htm has been compared to:

/products/portable/ThinkPad600/features.html and it will next be compared to:

/products/portable/ThinkPad600/specs.html then the computation of the common overlapping portion could be reused:

/products/portable/ThinkPad600

Rather than computing every cost comparison independently, the Hierarchical String Matching process 110 makes use of the fact that a partial result from one computation can potentially be used as the starting point of another computation.

Figure 2A:
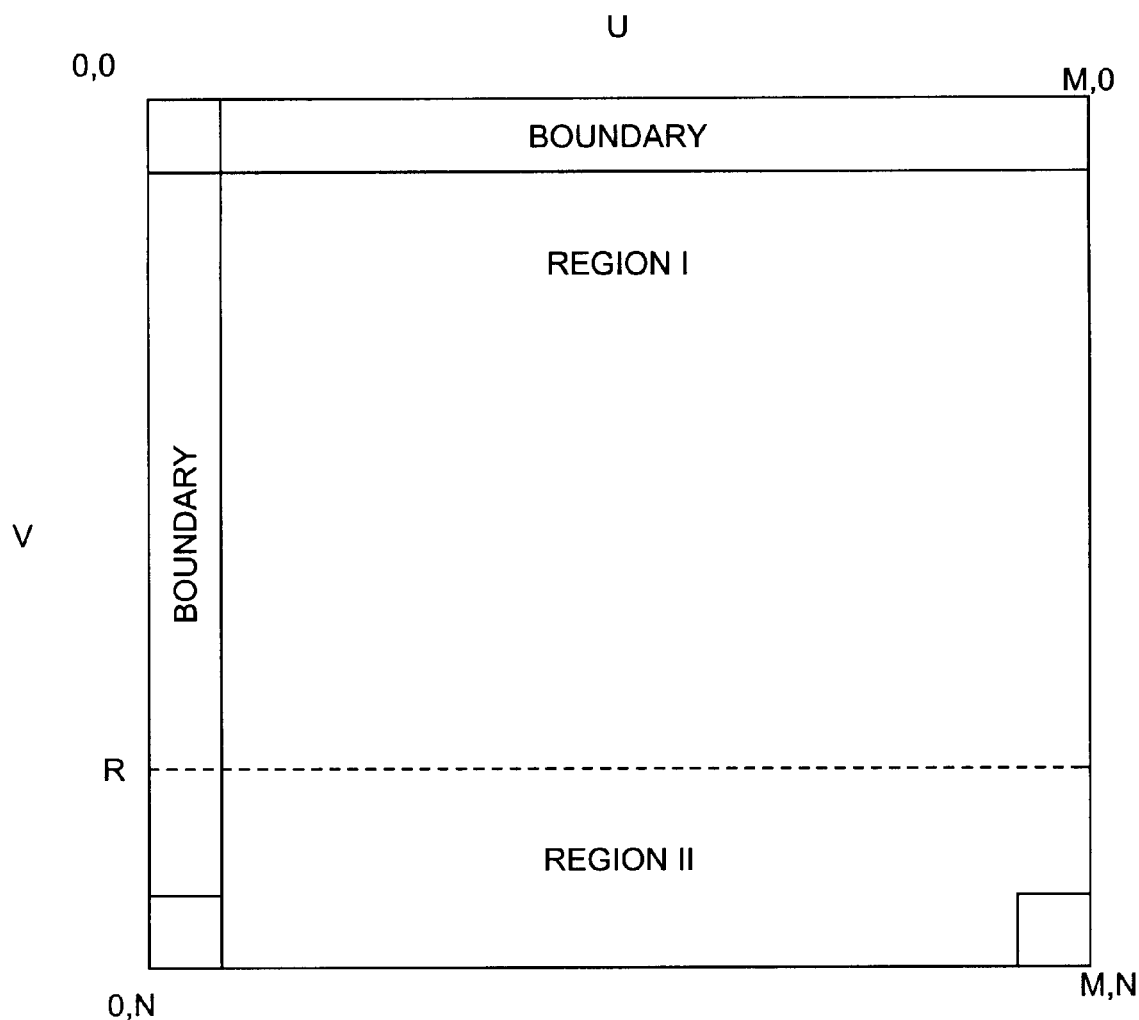
FIG. 2A graphically illustrates the method of reusing computations according to the preferred embodiment of the present invention.

FIG. 2A graphically illustrates the method of reusing computations according to the preferred embodiment of the present invention. After the boundary has been computed, the Hierarchical String Matching process 110 starts its computation with the 1,1 coordinate of the tableau, which is in the upper left corner. Let strings U have m characters and V have n characters. The final solution is given by the solution at the m,n corner of the tableau. Region I represents the common path portion of U and V, which has already been computed. In this case, the Hierarchical String Matching process 110 has already compared the first R characters of V with all of the characters of U. Thus, only Region II needs to be computed to finish the computation of the edit-distance cost.

Figure 2B:
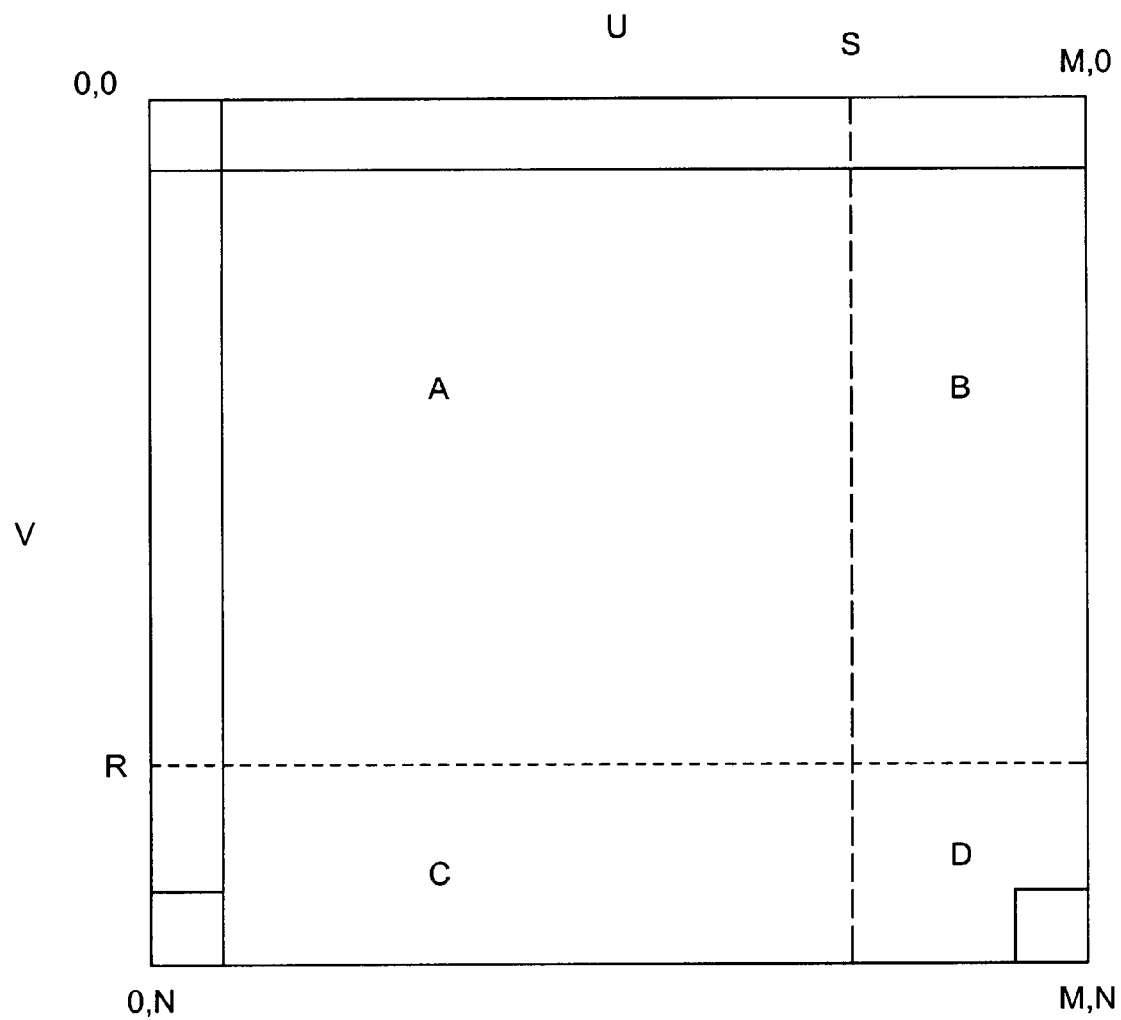
FIG. 2B graphically illustrates a more general case of reusing computations according to the preferred embodiment of the present invention.

FIG. 2B graphically illustrates a more general case of reusing computations according to the preferred embodiment of the present invention, in which the costs of the first S characters of U with the first R characters of V have already been computed. In this case, the Hierarchical String Matching process 110 need only compute the costs of regions B, C, and D.

Figure 3A:
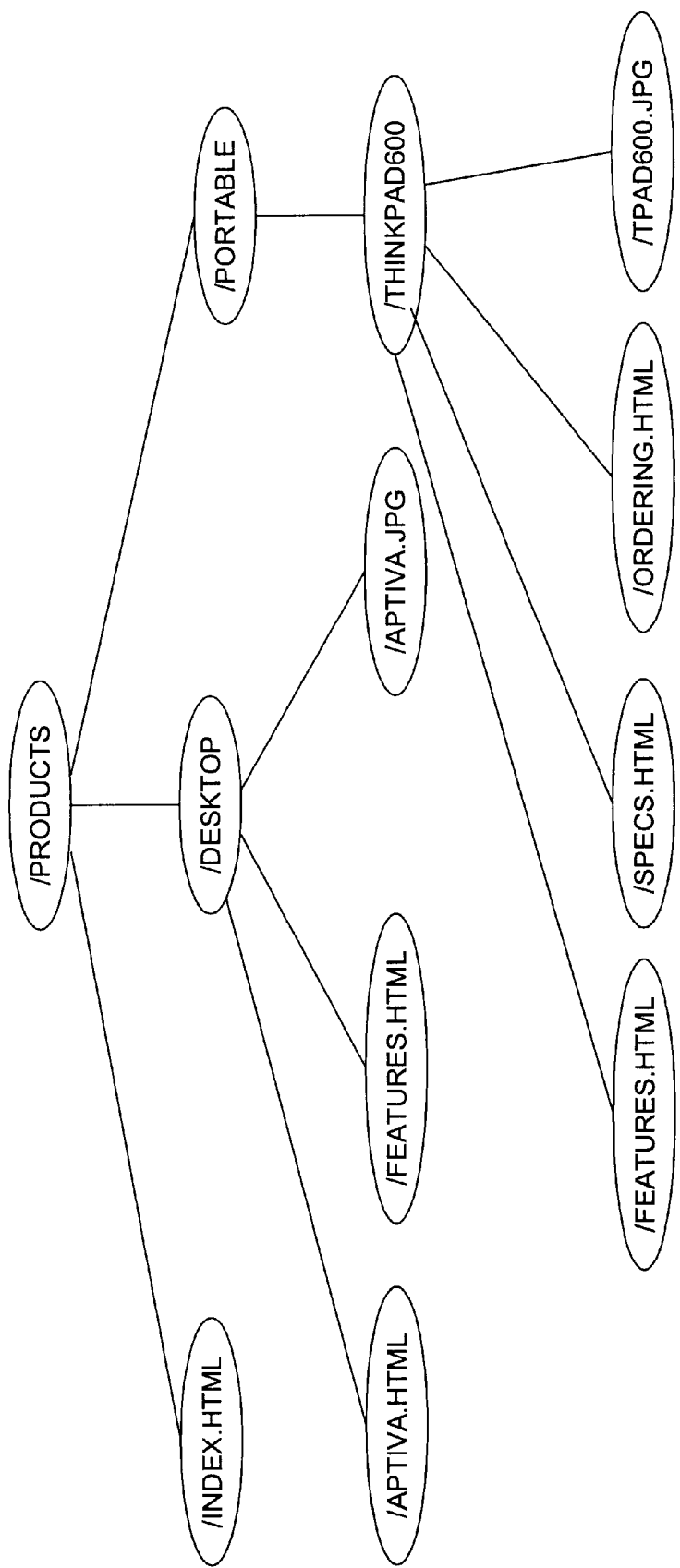
FIGS. 3A and 3B each illustrates a hierarchical tree representation of the example data described herein, according to the preferred embodiment of the present invention.

FIG. 3A illustrates a hierarchical tree representation of the example data described herein, according to the preferred embodiment of the present invention. The tree is comprised of nodes (represented by the ovals) and edges which connect the nodes together. A node which is connected to another node above it is called a child, and the node above it is called the parent. Parent nodes may have zero or more children, and children can in turn be parents of nodes that lie further below.

Given any target node in a tree, a path is defined to be the concatenated string of data of all nodes that must be visited in the traversal from the top-level node to the target node. For example, for the node /Aptiva.html in FIG. 3A, the entire path up to and including that node would be /products/desktop/Aptiva.html.

There are several ways to create trees. The underlying hierarchical representation of the data could be used (e.g., in the Web server 108 case, this would be the underlying file system hierarchy) or a more fine-grained approach could-be used as shown in FIG. 3B, and a tree built having each character represented by a different node in the tree.

Figure 3B:
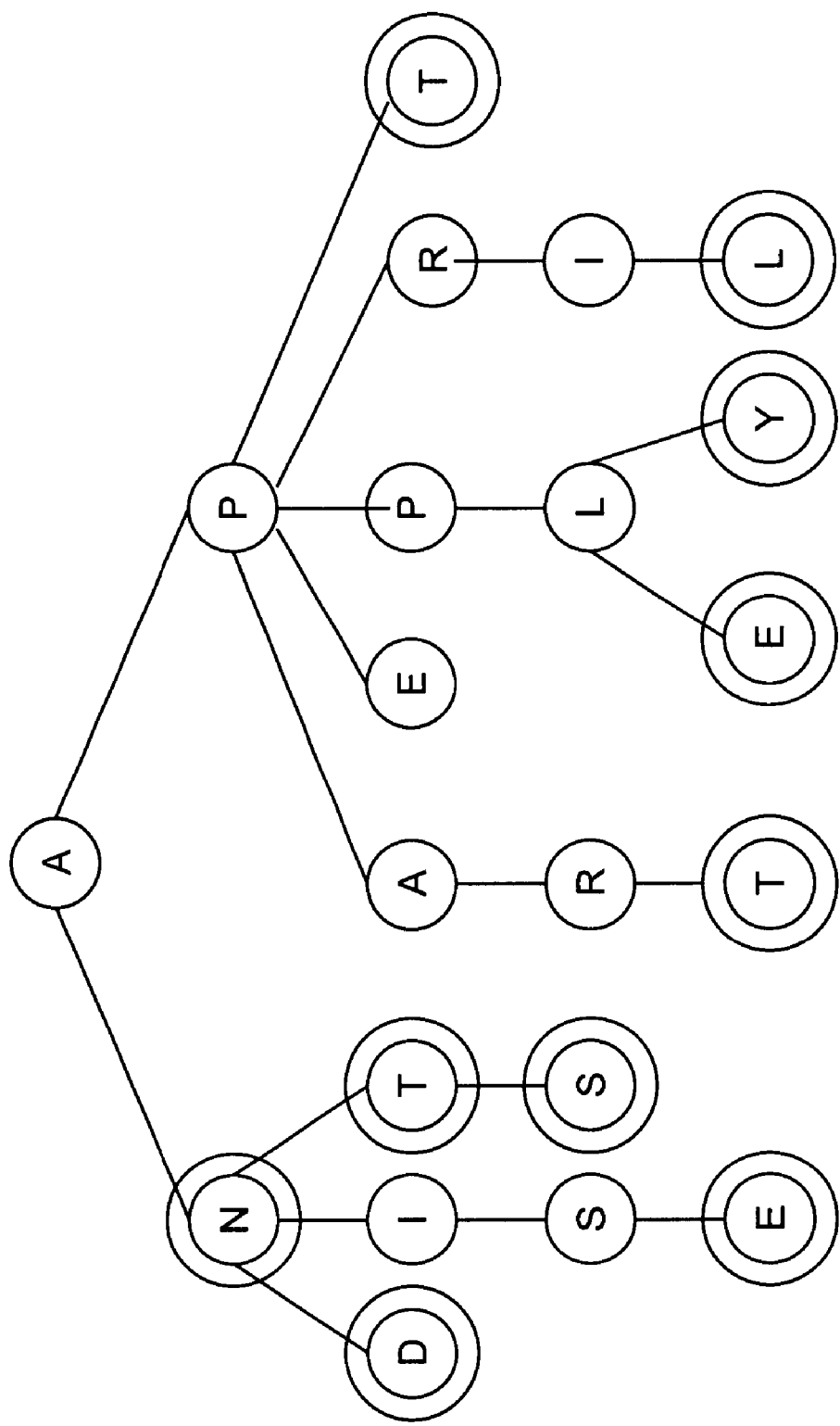

FIG. 3B illustrates how a hierarchical tree might be implemented from a dictionary comprising the following strings:

AN
AND
ANISE
ANT, ANTS
APART
APE
APPLE
APPLY
APRIL APT

In this example, each letter represents a node, rather than each path section as shown in FIG. 3A. The double circles represents word termination nodes.

By keeping track of the items in S using a tree data structure, a depth first search traversal can be used to generate an ordering of strings, which can then reuse the partial computations. This is because, in a depth-first search tree traversal, it is known that at each node visited, the portion of the path back to the root of the tree that is shared with any other path that was visited must have already had an edit-distance cost computation. The solution from the shared portion of the path then can be reused.

Let V be the target string which is being compared to U. The Hierarchical String Matching process 110 iterates through all of the URLs being compared to U by doing a depth first search using pre-order node visitation.

A pre-order depth first search has several advantages: It allows the Hierarchical String Matching process 110 to efficiently generate a complete list of paths, since every path which is present is generated in the traversal. It is also easy to implement, and it can very efficiently keep track of the current partial-solution necessary for use in the next node visitation in the tree. A breadth first search implementation would require significantly more memory usage, because of the need to keep track of multiple partial solutions at all the branches at the each level of the tree.

Using the example in FIG. 3A, the depth-first search ordering of the nodes would be:

/products

/products/index.html
/products/desktop
/products/desktop/Aptiva.html
/products/desktop/features.html
/products/desktop/Aptiva.jpg
/products/portable
/products/portable/ThinkPad600
/products/portable/ThinkPad600/features.html
/products/portable/ThinkPad600/specs.html
/products/portable/ThinkPad600/ordering.html
/products/portable/ThinkPad600/tpad600.jpg Note that this visitation includes strings which are not in the original set of comparison strings S for this example. If desired, the Hierarchical String Matching process 110 can elect to only allow strings that were in the original set S be candidates by marking nodes as part of the potential solution set.

There are two ways of building the hierarchical data structure, and either or both may be used, depending on the application. The first is to build a static hierarchy. However, many applications contain a significant amount of dynamic data and thus require a dynamic hierarchy. For those applications, it is possible to dynamically add paths to the hierarchy whenever new paths are encountered.

Another possible method for solving this problem is to provide a registration mechanism where specific strings can be registered to the Hierarchical String Matching process 110.

Logic of the Hierarchical String Matching Process

Figure 4:
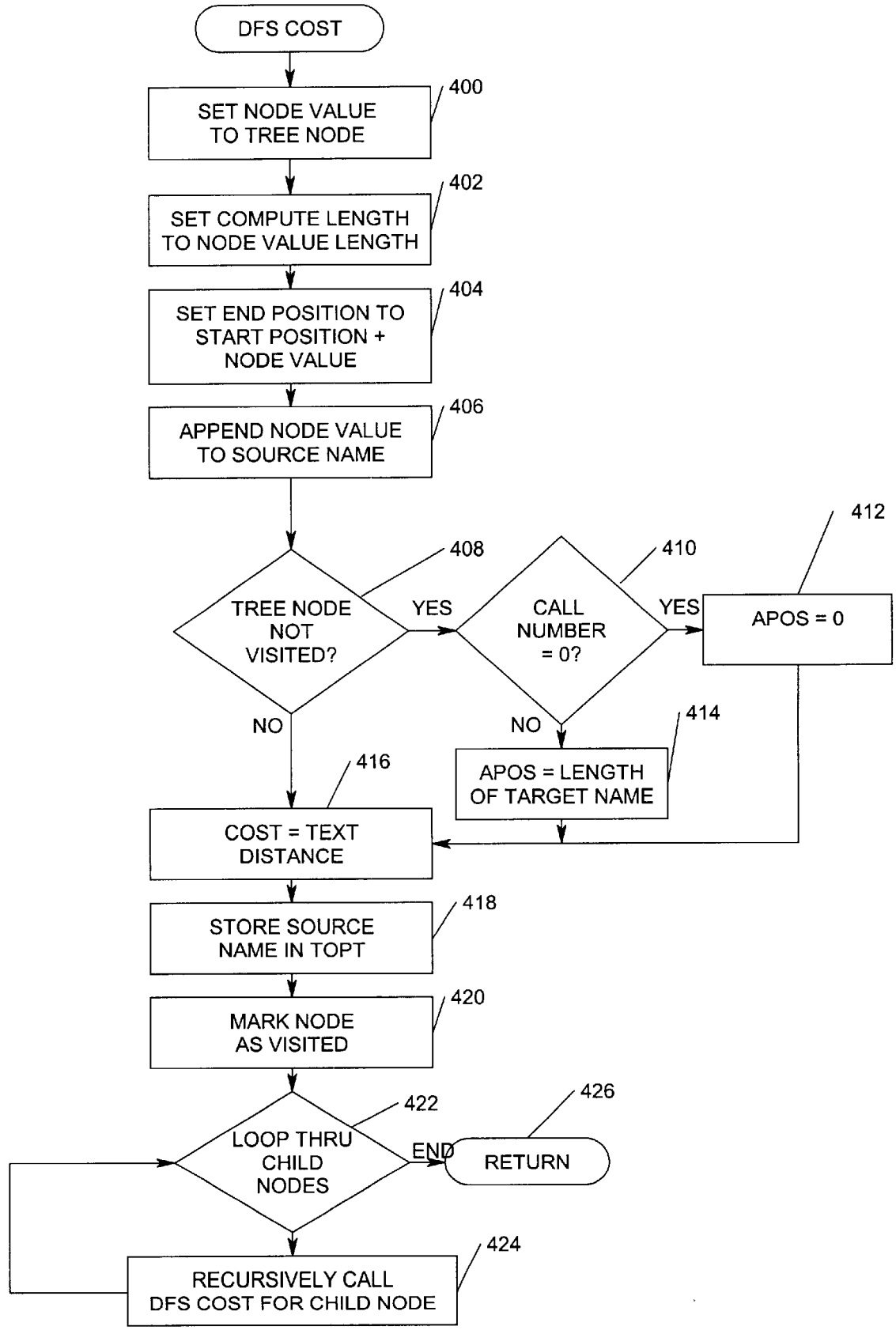
FIG. 4 is a flowchart that illustrates the logic of the DFS COST procedure according to the preferred embodiment of the present invention.
Figure 5A:
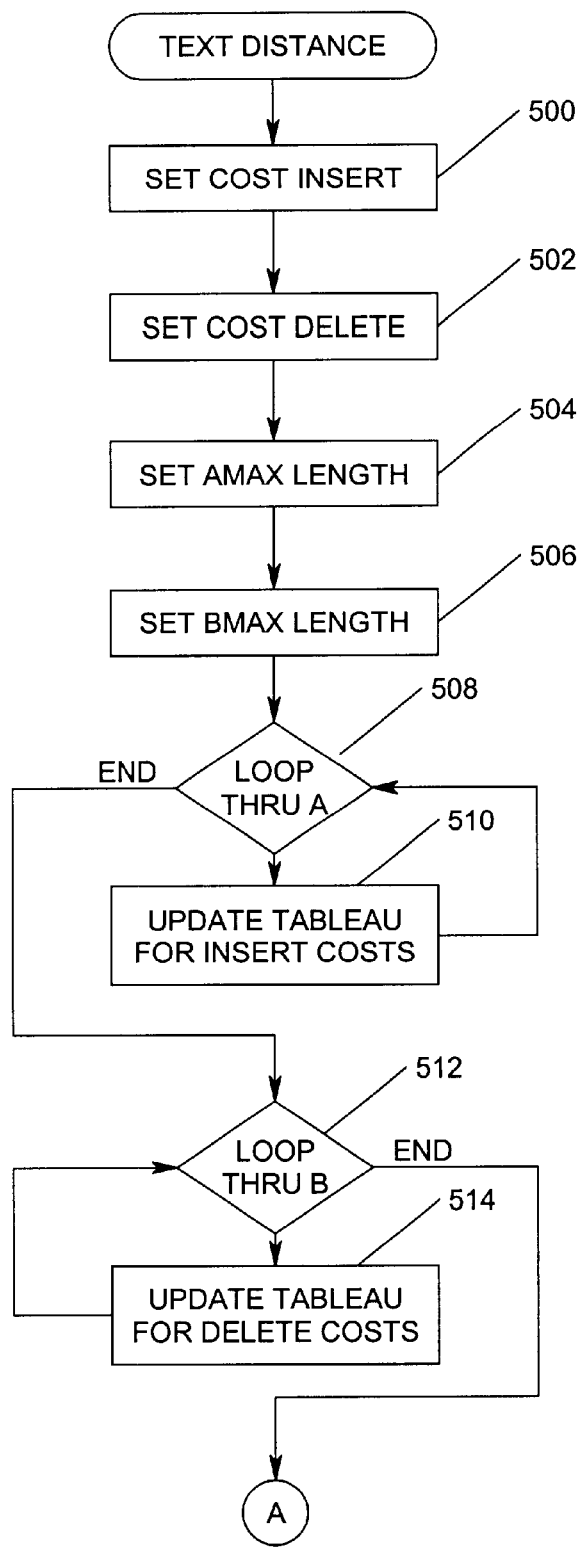
FIGS. 5A and 5B together are a flowchart that illustrates the logic of the TEXT DISTANCE procedure according to the preferred embodiment of the present invention.
Figure 5B:
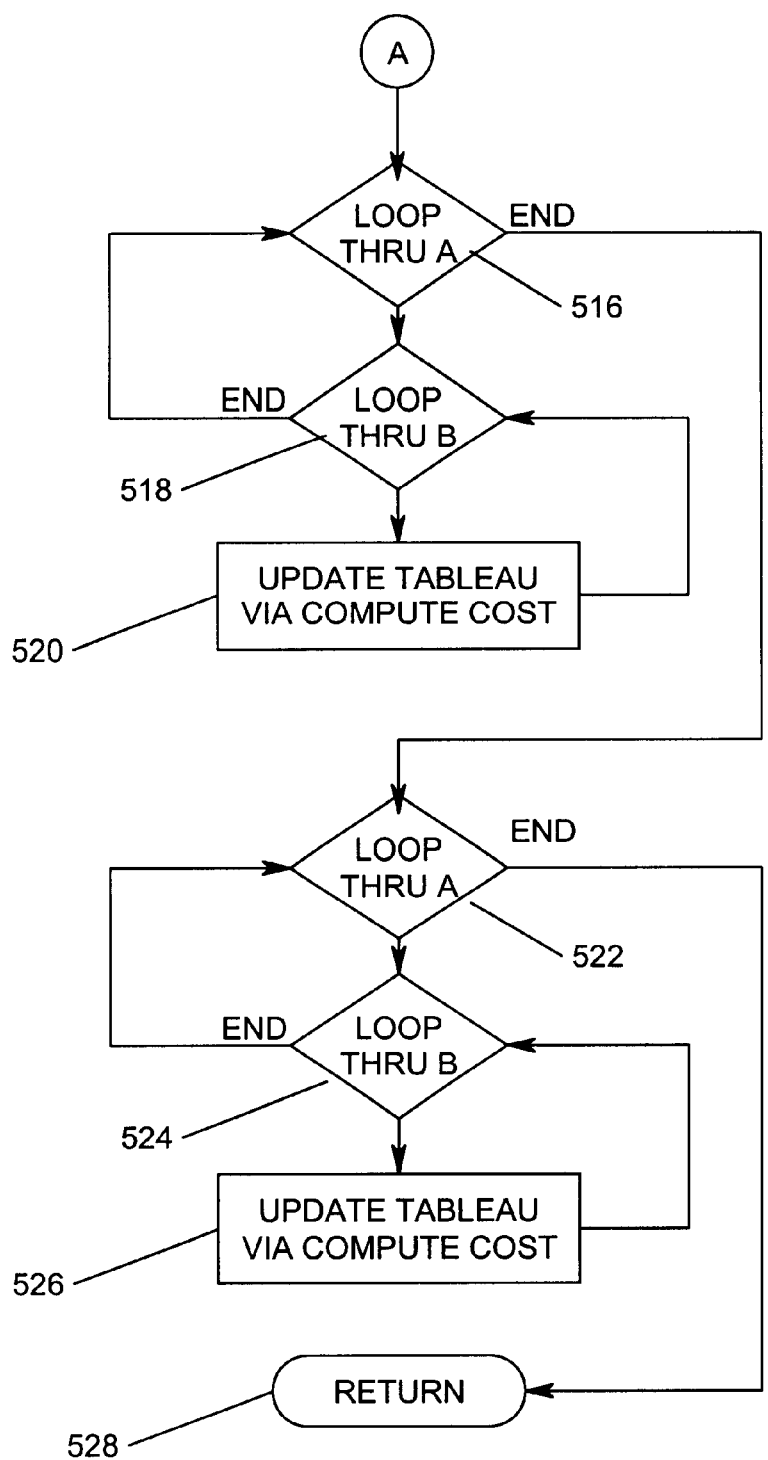
Figure 6:
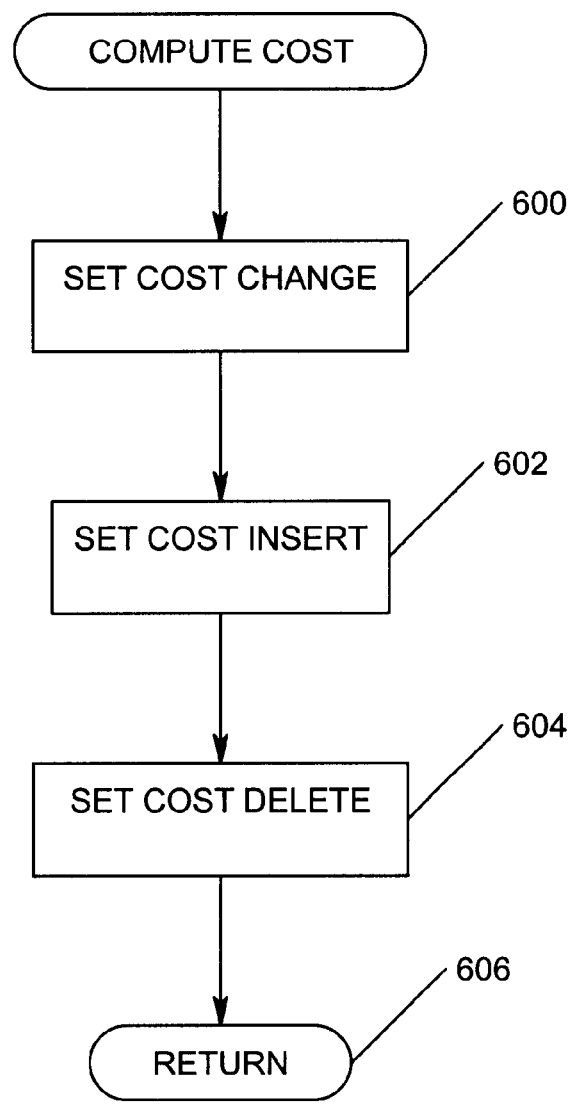
FIG. 6 is a flowchart that illustrates the logic of the COMPUTE COST procedure according to the preferred embodiment of the present invention.

Flowcharts that illustrate the logic of the Hierarchical String Matching process 110 of the present invention are shown in FIGS. 4, 5, and 6. Those skilled in the art will recognize that this logic is provided for illustrative purposes only and that different logic may be used to accomplish the same results.

DFS COST Procedure

FIG. 4 is a flowchart that illustrates the logic of the DFS COST procedure, which determines the cost of a depth first search (DFS) traversal of the hierarchical tree.

This procedure accepts the following input:

TreeNode is a node of a tree, containing a string value and children,

TopT is a list of top T best results found so far,

SourceName[ ] is an array of characters comprising the source string for comparison, TargetName[ ] is an array of characters comprising the target string, tableau[x ][y ] is a two-dimensional array of the current edit-distance computation, StartPosition is a position up to which there is a previously computed solution comparing SourceName to TargetName, and CallNumber is the number of times this procedure has been called.

This procedure generates the following output:

TopT is updated to contain the list of top T best results found, and tableau[x ][y ] is updated to contain the edit-distance cost of the string of characters denoted by the path from the root of the tree up to and including TreeNode.

Block 400 represents nodeValue being set to equal the value of the string represented at this TreeNode.

Block 402 represents computeLength being set equal to the length of nodeValue in characters.

Block 404 represents EndPosition being set to equal the StartPosition+computeLength.

Block 406 represents nodeValue being appended onto the end of SourceName starting at StartPosition.

Block 408 is a decision block that represents determining whether the TreeNode has not been visited. If so, control transfers to Block 410; otherwise, control transfers to Block 416.

Block 410 is a decision block that represents determining whether CallNumber is equal to 0. If so, control transfers to Block 412; otherwise, control transfers to Block 414.

Block 412 represents aPos being set equal to 0.

Block 414 represents aPos being set equal to the length of TargetName in characters.

Block 416 represents Cost being set equal to the return value from the TEXT DISTANCE procedure, which is called with the parameters SourceName, TargetName, tableau, aPos, and StartPosition.

Block 418 represents SourceName being stored in TopT if SourceName is in the top T costs found so far.

Block 420 represents TreeNode being marked as visited.

Blocks 422–424 represents a loop through each child node of TreeNode, wherein a recursive call is made at Block 424 to the DFS COST procedure, with child, TopT, SourceName, TargetName, tableau, EndPosition, and CallNumber+1 as parameters.

Thereafter, the procedure exits at Block 426.

TEXT DISTANCE Procedure

FIGS. 5A and 5B together are a flowchart that illustrates the logic of the TEXT DISTANCE procedure, which determines a partial string edit-distance costs for a source string being compared to a target string.

This procedure accepts the following input:

A is a string of characters that comprises the source for comparison,

B is a string of characters that comprises the target for comparison, tableau[x ][y ] is a two-dimensional array of costs which may be partially computed, aStartPos is the first position in A from which to start the computation, and bStartPos is the first position in B from which to start computation.

This procedure generates the following output:

tableau[x ][y ] contains the partial edit-distance costs between A and B.

Block 500 represents insertCost being set to equal the cost for inserting a character.

Block 502 represents deleteCost being set to equal the cost for deleting a character.

Block 504 represents aMax being set to equal the length of A in characters.

Block 506 represents bMax being set to equal the length of B in characters.

Block 508 comprises a loop for computing boundary costs, wherein a counter is incremented from 1+aStartPos to aMax.

Block 510 represents tableau[i][0] being set to equal tableau[i−1][0]+insertCost.

Upon completion of the loop, control transfers to Block 512.

Block 512 comprises a loop for computing boundary costs, wherein a counter is incremented from 1+bStartPos to bMax.

Block 514 represents tableau[0][i] being set to equal tableau[0][i−1]+deleteCost.

Upon completion of the loop, control transfers to Block 516.

Blocks 516–520 comprise loops for filling in Section B of FIG. 2B, wherein Block 516 represents a counter i being incremented from 1+aStartPos to aMax and Block 518 represents a counter j being incremented from 1 to bMax for each increment of i.

Block 520 represents tableau [i][j] being set to equal the return value from the COMPUTE COST procedure, which is called with the parameters tableau, i, j, A, and B.

Blocks 522–526 comprise loops for filing in Sections C and D of FIG. 2B, wherein Block 522 represents a counter i being incremented from 1 to aMax and Block 524 represents a counter j being incremented from bStartPos+1 to bMax for each increment of i.

Block 526 represents tableau [i][j] being set to equal the return value from the COMPUTE COST procedure, which is called with the parameters tableau, i, j, A, and B.

Block 528 represents the edit distance cost being returned from the procedure, wherein the edit distance cost comprises the last item computed in the table, i.e., tableau[aMax−1][bMax−1].

COMPUTE COST Procedure

FIG. 6 is a flowchart that illustrates the logic of the COMPUTE COST procedure, which finds the minimum cost of transforming a particular character in A into a particular character in B, based on the previously computed tableau values.

This procedure accepts the following input:

tableau[x ][y] is a two-dimensional array of costs which may be partially computed, aindex is the character in String A being compared, bindex is the character in String B being compared, A is a String of characters, and B is a String of characters.

This procedure returns a value that represents the minimum cost for transforming A[aindex] into B[bindex].

Block 600 represents costChange being set to equal tableau[aindex−1][bindex−1]+matchCost.

Block 602 represents costInsert being set to equal tableau[aindex][bindex−1]+insertCost.

Block 604 represents costDelete being set to equal tableau[aindex−1][bindex]+deleteCost.

Finally, Block 606 represents the procedure returning the minimum value of costChange, costinsert, or costDelete.

Conclusion

This concludes the description of the preferred embodiment of the invention. The following describes some alternative embodiments for accomplishing the present invention.

For example, any type of string matching problem could benefit from the present invention. In addition, any type of computer configuration and/or network configuration could be used to implement the present invention.

In summary, the present invention discloses a method, system, and article of manufacture for generating a list of candidate objects for a requested object. An identifier for the requested object is accepted, wherein the identifier comprises a target string. A list of candidate objects is generated when the requested object cannot be found by performing a hierarchical string match for the target string against a set of source strings using multi-path dynamic programming, wherein the set of source strings represent a set of objects from which the list of candidate.objects is generated.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of generating a test of candidate objects for a requested object, comprising:
   (a) accepting an identifier for the requested object, wherein the identifier comprises a target string;
   (b) generating a list of candidate objects based on a cost function by performing a hierarchical stag match for the target string against a set of source strings using multi-path dynamic programming, wherein:
      (i) the set of source strings represent a set of objects from which the list of candidate objects is generated; and
      (ii) a hierarchy is utilized to minimize computation of the cost function by reusing a previous partially-computed cost computation solution as a starting point of another cost computation solution.

2. The method of claim 1, wherein the generating step is performed when the requested object cannot be found.

3. The method of claim 1, wherein the target string and the source strings each represents a Uniform Resource Locator.

4. The method of claim 1, further comprising limiting the list of candidate objects.

5. The method of claim 1, wherein the list of candidate objects comprises a list of most likely matches.

6. The method of claim 1, wherein the cost function uses a minimum-cost string edit-distance to generate the list of candidate objects for the target string from the set of source strings.

7. The method of claim 6, wherein the minimum-cost string edit-distance finds one or more strings from the set of strings that are closer matches to the target string.

8. The method of claim 6, wherein the minimum-cost string edit-distance comprises a cost of transforming the target string into one of the source strings.

9. The method of claim 6, wherein the source strings are represented in a hierarchical tree structure.

10. The method of claim 9, further comprising re-using previous partially-computed solutions due to an overlap among source strings in the set of source strings represented in the hierarchical tree structure.

11. The method of claim 9, wherein each of the source strings comprise a path in the hierarchical tree structure.

12. The method of claim 11, wherein the path in the hierarchical tree structure comprises a plurality of concatenated nodes that are visited in a traversal from a top-level node to a target node.

13. The method of claim 9, further comprising performing a depth first search traversal of the hierarchical tree structure to generate an ordering of the source strings.

14. The method of claim 13, wherein the depth first search traversal reuses partial computations of the hierarchical tree structure to generate the ordering of the source strings.

15. The method of claim 13, wherein the depth first search traversal reuses partial computations of the edit-distance cost for a shared portion of the path traversed in the hierarchical tree structure.

16. The method of claim 13, further comprising iterating through all the source strings being compared to the target string by performing a depth first search traversal of the hierarchical tree structure using pre-order node visitation.

17. The method of claim 9, wherein the list of candidate objects list is generated using the cost function based on the differences between the target string and the set of source strings.

18. The method of claim 17, further comprising computing cost comparisons using a partial result from a first comparison of the target string to a first one of the source strings as a starting point of a second comparison of the target string to a second one of the source strings.

19. A system for generating a list of candidate objects for a requested object comprising:
(a) a computer;
(b) means, performed by the computer, for accepting an identifier for the requested object, wherein the identifier comprises a target string;
(c) means, performed by the computer, for generating a list of candidate objects based on a cost function when the requested object cannot be found by performing a hierarchical string match for the target string against a set of source strings using multi-path dynamic programming, wherein:
(i) the set of source strings represent a set of objects from which the list of candidate objects is generated; and
(ii) a hierarchy is utilized to minimize computation of the cost function by reusing a previous partially-computed cost computation solution as a staring point of another cost computation solution.

20. The system of claim 19, wherein the means for generating is performed when the requested object cannot be found.

21. The system of claim 19, wherein the target string and the source strings each represents a Uniform Resource Locator.

22. The system of claim 19, further comprising means for limiting the list of candidate objects.

23. The system of claim 19, wherein the list of candidate objects comprises a list of most likely matches.

24. The system of claim 19, wherein the cost function uses a minimum-cost string edit-distance to generate the list of candidate objects for the target string from the set of source strings.

25. The system of claim 24, wherein the minimum-cost string edit-distance finds one or more strings from the set of strings that are closest matches to the target string.

26. The system of claim 24, wherein the minimum-cost string edit-distance comprises a cost of transforming the target string into one of the source strings.

27. The system of claim 24, wherein the source strings are represented in a hierarchical tree structure.

28. The system of claim 27, further comprising means for re-using precious partially-computed solutions due to an overlap among source strings in the set of source strings represented in the hierarchical tree structure.

29. The system of claim 27, wherein each of the source strings comprise a path in the hierarchical tree structure.

30. The system of claim 29, wherein the path in the hierarchical tree structure comprises a plurality of concatenated nodes that are visited in a traversal from a top-level node to a target node.

31. The system of claim 27, further comprising means for performing a depth first search traversal of the hierarchical tree structure to generate an ordering of the source strings.

32. The system of claim 31, wherein the depth first search traversal reuses partial computations of the hierarchical tree structure to generate the ordering of the source strings.

33. The system of claim 31, wherein the depth first search traversal reuses partial computations of the edit-distance cost for a shared portion of the path traversed in the hierarchical tree structure.

34. The system of claim 31, further comprising means for iterating through all the source strings being compared to the target string by performing a depth first search traversal of the hierarchical tree structure using pre-order node visitation.

35. The system of claim 27, wherein the list of candidate objects list is generated using the cost function based on the differences between the target string and the set of source strings.

36. The system of claim 35, further comprising means for computing cost comparisons using a partial result from a first comparison of the target string to a first one of the source strings as a starting point of a second comparison of the target string to a second one of the source strings.

37. An article of manufacture embodying logic for performing a method of generating a list of candidate objects for a requested object, the method comprising:
(a) accepting an identifier for the requested object, wherein the identifier comprises a target string;
(b) generating a list of candidate objects based on a cost function when the requested object cannot be found by performing a hierarchical string match for the target string against a set of source strings using multi-path dynamic programing, wherein:
(i) the set of source strings represent a set of objects from which the list of candidate objects is generated; and
(ii) a hierarchy is utilized to minimize computation of the cost function by reusing a previous partially-computed cost computation solution as a starting point of another cost computation solution.

38. The system of claim 37, wherein the generating step is performed when the requested object cannot be found.

39. The system of claim 37, wherein the target string and the source strings each represents a Uniform Resource Locator.

40. The system of claim 37, further comprising limiting the list of candidate objects.

41. The system of claim 37, wherein the list of candidate objects comprises a list of most likely matches.

42. The system of claim 37, wherein the cost function uses a minimum-cost string edit-distance to generate the list of candidate objects for the target string from the set of source strings.

43. The system of claim 42, wherein the minimum-cost string edit-distance finds one or more strings from the set of strings that are closest matches to the target string.

44. The system of claim 42, wherein the minimum-cost string edit-distance comprises a cost of transforming the target string into one of the source strings.

45. The system of claim 42, wherein the source strings are represented in a hierarchical tree structure.

46. The system of claim 45, further comprising re-using previous partially-computed solutions due to an overlap among source strings in the sec of source strings represented in the hierarchical tree structure.

47. The system of claim 45, wherein each of the source strings comprise a path in the hierarchical tree structure.

48. The system of claim 47, wherein the path in the hierarchical tree structure comprises a plurality of concatenated nodes that are visited in a traversal from a top-level node to a target node.

49. The system of claim 45, further comprising performing a depth first search traversal of the hierarchical tree structure to generate an ordering of the source strings.

50. The system of claim 49, wherein the depth first search traversal reuses partial computations of the hierarchical tree structure to generate the ordering of the source strings.

51. The system of claim 49, wherein the depth first search traversal reuses partial computations of the edit-distance cost for a shared portion of the path traversed in the hierarchical tree structure.

52. The system of claim 49, further comprising iterating through all the source strings being compared to the target string by performing a depth first search traversal of the hierarchical tree structure using pre-order node visitation.

53. The system of claim 45, wherein the list of candidate objects list is generated using the cost function based on the differences between the target so and the set of source strings.

54. The system of claim 53, further comprising computing cost comparisons using a partial result from a first comparison of the target string to a first one of the source strings as a starting point of a second comparison of the target string to a second one of the source strings.

* * * * *